Dec. 7, 1926.

C. A. SMITH 1,609,317

COOKING APPARATUS

Filed Jan. 31, 1925   7 Sheets-Sheet 1

Fig. 1.

Inventor

C. A. SMITH,

By

Attorney

Dec. 7, 1926.

C. A. SMITH

COOKING APPARATUS

Filed Jan. 31, 1925

Inventor
C. A. Smith,
By
Attorney

Dec. 7, 1926. 1,609,317
C. A. SMITH
COOKING APPARATUS
Filed Jan. 31, 1925 7 Sheets-Sheet 3

Fig. 4.

Inventor
C. A. Smith,
By
Attorney

Inventor
C. A. SMITH,

Dec. 7, 1926.

C. A. SMITH 1,609,317

COOKING APPARATUS

Filed Jan. 31, 1925     7 Sheets-Sheet 5

Inventor
C. A. SMITH,
By
Attorney

Dec. 7, 1926. 1,609,317
C. A. SMITH
COOKING APPARATUS
Filed Jan. 31, 1925 7 Sheets-Sheet 6.

Inventor
C. A. SMITH,
By
Attorney

Patented Dec. 7, 1926.

1,609,317

UNITED STATES PATENT OFFICE.

CLARENCE A. SMITH, OF WASHINGTON, DISTRICT OF COLUMBIA.

COOKING APPARATUS.

Application filed January 31, 1925. Serial No. 6,134.

My invention relates to a cooking apparatus.

An important object of the invention is to provide means whereby a filler may be previously heated or cooked, and subsequently enclosed in a casing or covering of fluid batter, which is in turn cooked.

A further object of the invention is to provide a cooking apparatus of the above mentioned character, which is relatively small, compact, attractive, and neat in appearance, whereby the same is particularly well adapted for use at soda fountains or the like.

A further object of the invention is to provide a unit of the above mentioned character, embodying companion irons, having recesses or pockets for receiving the fluid batter, the recesses in one iron being deeper than the recesses in the other iron, with means for preventing the iron with the deeper recesses being moved upwardly to the open positions when the irons are inverted, whereby the operator is compelled to first introduce the fluid batter into the deeper recesses.

A further object of the invention is to provide apparatus of the above mentioned character, having a pair of companion irons, which are supported in a manner to permit of the same being inverted, with electrical means to heat the irons.

A further object of the invention is to provide reliable and simple means for supplying the current to the electrical heating elements of the irons.

A further object of the invention is to provide apparatus of the above mentioned character having means whereby the edible filler may be first conveniently heated or cooked, without liability of the grease or the like passing from the apparatus.

A further object of the invention is to provide means whereby any of the fluid batter spilling or passing from the irons will be properly caught within the apparatus, thus preventing the same from passing to the exterior of the same.

Other objects and advantages of the invention will be apparent during the course of the following description.

In the accompanying drawings forming a part of this specification, and in which like numerals are employed to designate like parts throughout the same.

In the drawings, wherein for the purpose of illustration is shown a preferred embodiment of my invention the numeral 15 designates a preferably rectangular casing, which may be formed of any suitable material, such as metal. This casing may be cast integral although the invention is in no sense restricted to this casting feature.

The casing 15 is preferably open at its bottom and is provided with legs 16, upon which the same rests. At its top, this casing 15 is provided with a large opening 17, surrounded by a horizontal flange 18, as shown.

The cooking mold is designated as a whole by the numeral 19, and embodies upper and lower sections or irons 20 and 21. These sections or irons are preferably formed of aluminum as this metal will prevent the batter from sticking thereto, although the invention is not restricted to the use of any particular form of metal. The section or iron 20 is provided with recesses or pockets 22, for co-action with recesses or pockets 23, formed in the section or iron 21. The recesses 23 are deeper than the recesses 22. The co-acting recesses 22 and 23 are shown in a shape for cooking batter about a frankfurter. These recesses are provided with ribs or flanges 24, for properly distributing the heat. The lower recesses have upstanding supporting lugs 25, which support the frankfurter suitably spaced from the bottom of the recess, to permit the fluid batter passing beneath the frankfurter. The invention is in no sense restricted to the precise shape of the recesses or pockets, nor to the idea of enclosing a frankfurter in a fluid batter. The shape of the recesses may be varied, depending upon the character of the edible filler, to be enclosed within the baked fluid batter, and the present shape of recesses has been for the purpose of illustration.

The lower section or iron 21, at its forward end, has a horizontal shank 26, preferably formed integral therewith. This shank is formed integral with a central tubular knuckle 27, which in turn is integral with a pivot tube 28, as shown. The upper section or iron 20 is provided with a pair of outer knuckles 29, preferably integral therewith and these knuckles pivotally receive a transverse tubular pivot 30, rigidly held within the central knuckle 27. The longitudinal tubular pivot 28 is rotatably mounted in a bearing, the lower portion 31 of which is formed in the wall of the casing 15, and the upper portion of which is in the form of a strap or bracket 32, attached to the casing. The pivot element 28 can thus turn upon a longitudinal axis, but cannot swing perceptively in a vertical plane. At their opposite ends, the sections or irons 20 and 21 are provided with cylindrical shanks or trunnions 33 and 34 preferably integral therewith, which are rotatably mounted within a recess 35, in the front wall of the casing 15, as shown. These shanks or trunnions carry handles 35', as shown. The upper section or iron 20 is provided with a stop lug 36, at its forward end, which is adapted to enter notches 37, and 38, as shown. In view of the description thus far given, it will be apparent that the upper section or iron 20, when in the normal upper position, may be raised to the open position whereby the fluid batter may be poured into the lower recesses or pockets 23, containing the heated or cooked frankfurter or other edible filler. As before stated, the recesses 23 are deeper than the recesses 22, as this is necessary since these recesses must first not only receive a sufficient amount of the fluid batter for the entire product but must also originally contain the edible filler. If the irons should be inverted, and an inexperienced operator attempt to open the same, this could not be done since the lower iron, even when inverted, cannot be swung to the open position. This renders it impossible for the operator by mistake, to initially introduce the material into the upper pockets. After the fluid batter has been introduced into the lower pockets in the presence of the filler, and the upper section or iron lowered to the closed position, the closed sections or irons may then be quickly inverted, and this is found to cause the fluid batter to properly cover the opposite side of the meat filler. It is seen that the fluid batter is not only acted upon by the expansion of the same, due to the heat, but is aided in surrounding the then lower portions of the edible filler, by the action of gravity.

Figure 1:
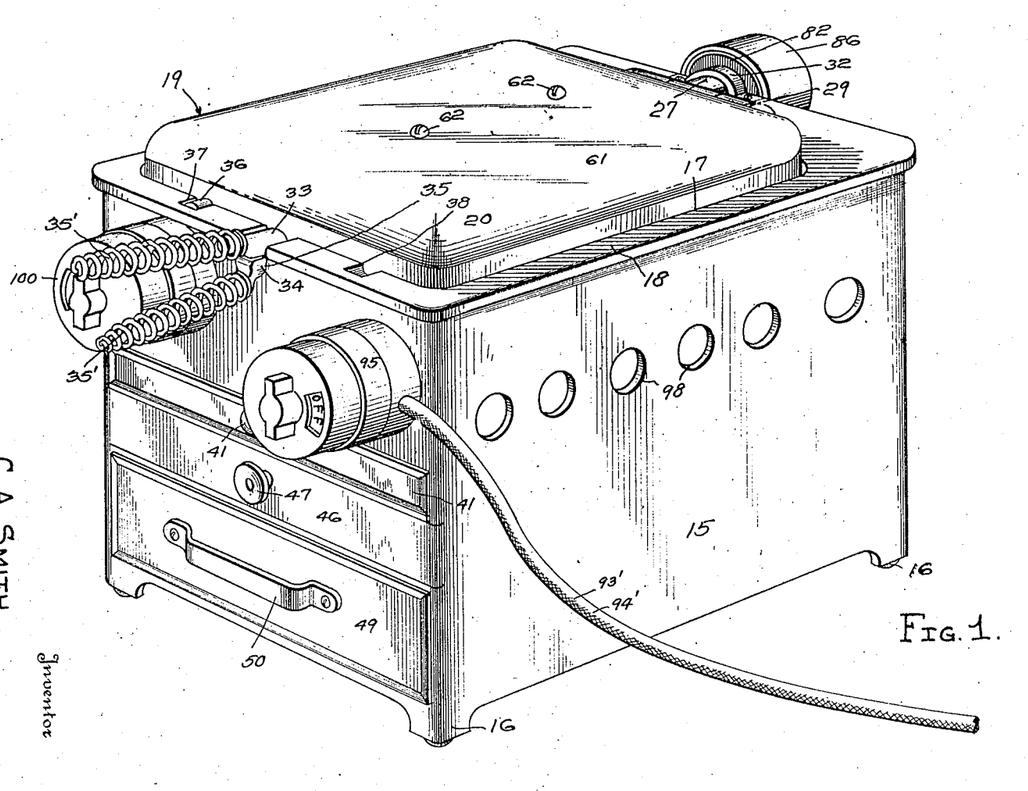
Figure 1 is a perspective view of a cooking unit or apparatus embodying my invention.
Figure 2:
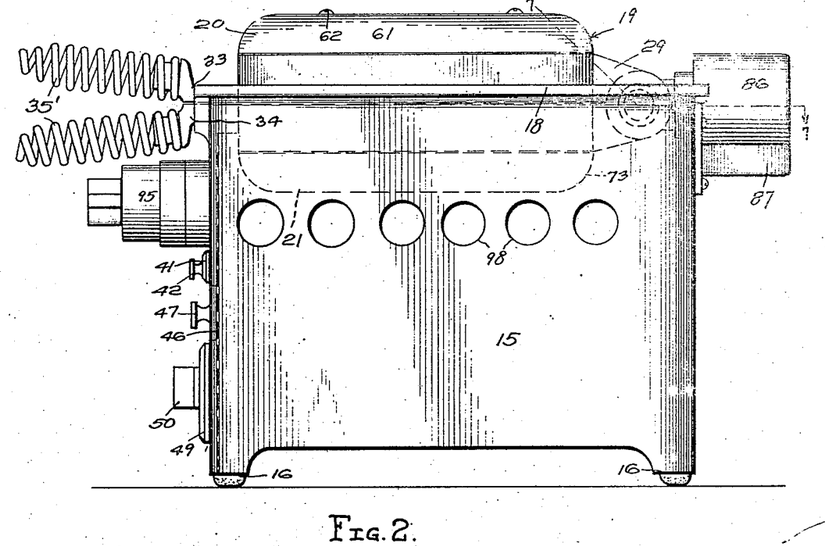
Figure 2 is a side elevation of the same.
Figure 3:
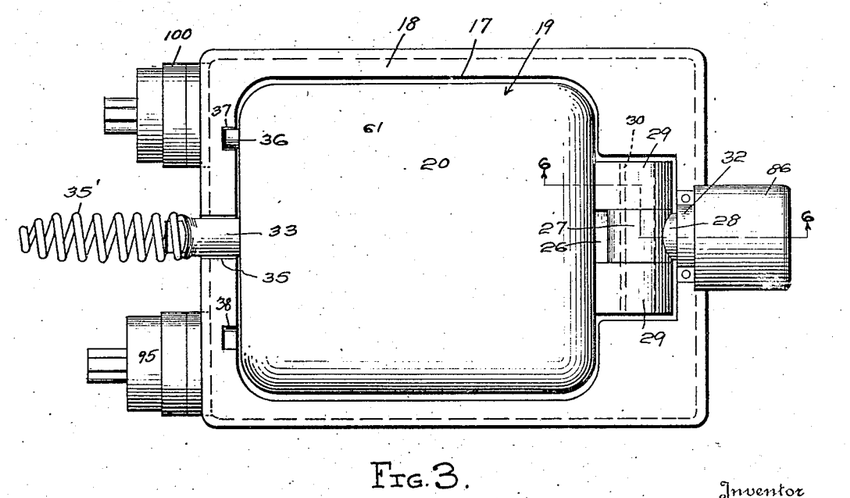
Figure 3 is a plan view of the same.

As more clearly shown in Figure 3, the opening 17 is suitably larger than the cooking mold or irons, and this provides a passage whereby any of the fluid batter spilling or escaping from the mold sections or irons may pass to the interior of the casing. This batter will be collected in a tray or pan 39, sliding through an opening 40 formed in the front end of the casing 15. This tray embodies an end or cover 41, which completely covers or conceals the opening 40, when the tray is in the closed position. The cover may be equipped with a handle 42 or the like, for convenience of manipulation.

The numeral 43 designates an electrical heating device for a grill or broiler. This device embodies an upper plate 44, which may be formed of metal or the like, and may be slidably mounted upon longitudinal horizontal supporting flanges 45, formed upon the sides of the casing 15. The pan 39 preferably rests upon the plate 44 but may be moved longitudinally independently of this plate. The plate 44 is movable through the opening 40 and this plate 44 has a depending supporting frame 45' attached thereto. Upon the outer end of the frame is a cover plate 46, suitably attached thereto and this cover plate is preferably flush with the front end of the casing 15, as shown. The cover plate may be equipped with a handle 47, for convenience of manipulation.

Figure 5:
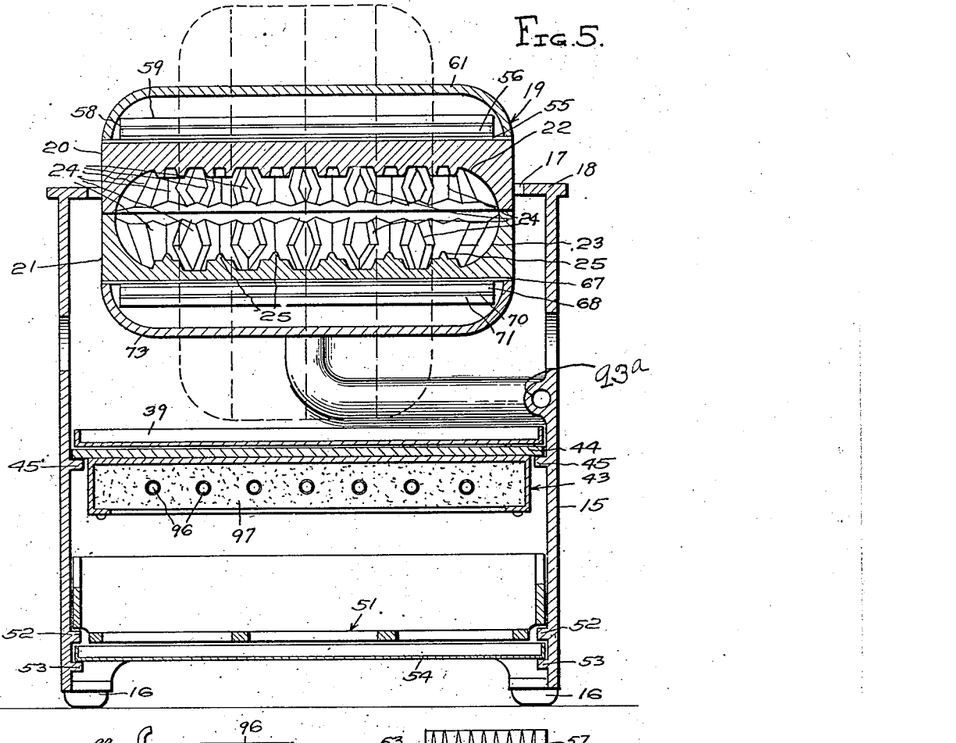
Figure 5 is a central tranverse vertical section through the same.

Arranged beneath the opening 40 is a lower opening 48, in the front end of the casing 15, and this opening may be covered by a cover plate 49, equipped with a handle 50 or the like. The cover plate is rigidly attached to one end of a broiler or grill 51, which is slidable upon longitudinal ribs or tracks 52, Figure 5, formed integral with the sides of the casing 15, as shown. Beneath the ribs or tracks 52 are ribs or tracks 53, slidably supporting a drip pan 54, which may be removed through the opening 48, but which is covered by the cover plate 49. It is thus seen that by first removing the grill or broiler 51, that this drip pan may be removed.

Particular attention is called to the fact that all of the operating parts of the apparatus are disposed upon or at the front end of the casing 15, and are out of the way of the customers facing the rear end of the machine, and this prevents the unauthorized manipulation of these parts by the customers.

Figures 6, 7:
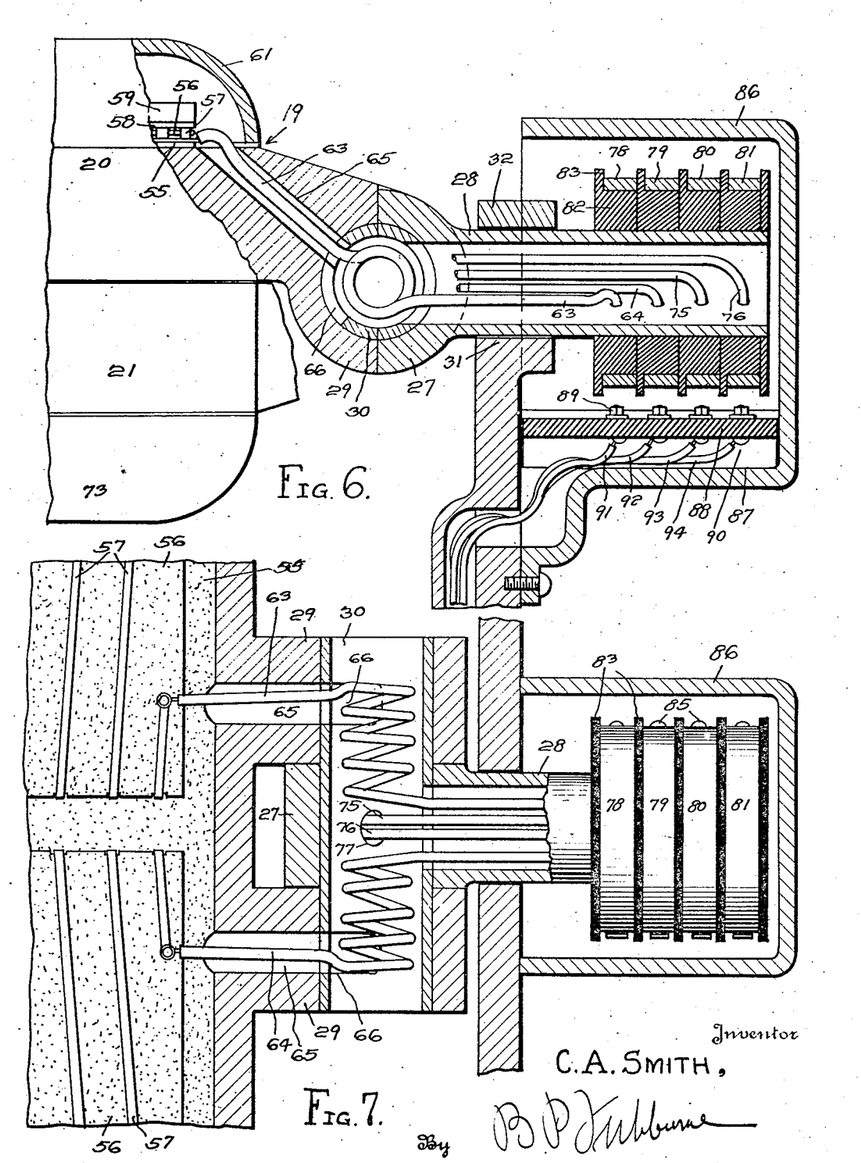
Figure 6 is a vertical section taken on line 6—6 of Figure 3.
Figure 7 is a horizontal section taken approximately on line 7—7 of Figure 2.
Figure 8:
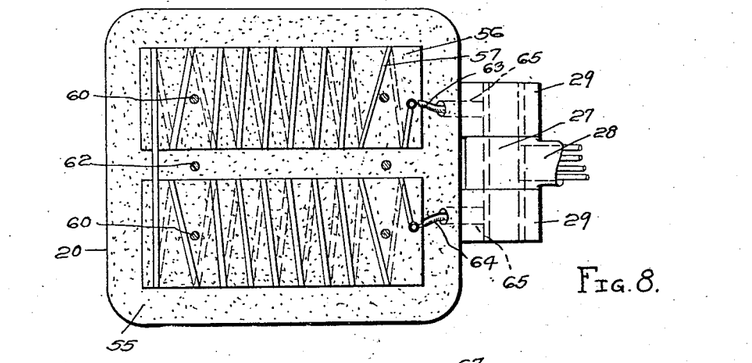
Figure 8 is a plan view of the electrical heating element of the upper iron.
Figure 9:
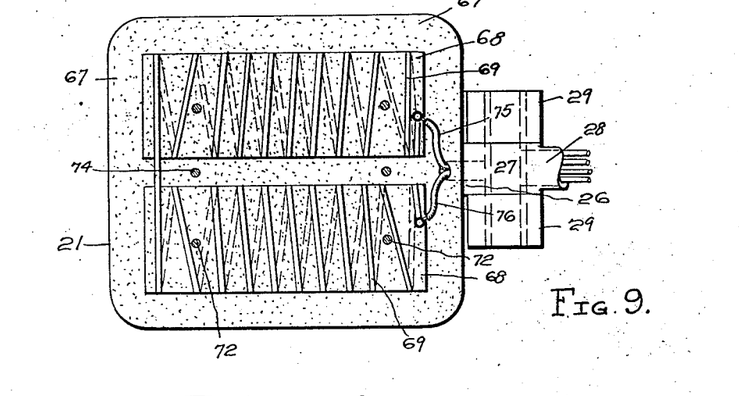
Figure 9 is a similar view, of the electrical heating element of the lower iron.

The upper section or iron 20 is electrically heated. I arrange upon the upper face of the section or iron 20 a sheet of mica 55, which is preferably of the same shape and size as this upper surface. Upon this sheet of mica I then arrange smaller sheets 56 of mica, carrying the turns of the resistance or heating element 57. Upon these heating elements I arrange another sheet of mica 58 and then arrange a metallic plate 59 upon the last sheet of mica. This metallic plate is held in place by screws 60 or the like. The resistance element is covered or enclosed by a cover 61, the edges of which engage the first layer of mica 55 and the cover is held in position by screws 62. One end of the resistance element 57 is connected with a wire 63, Figure 7, while its opposite end is connected with a wire 64. These wires pass through openings 65, formed in the knuckles 29, and the openings 65 register with segmental openings 66, formed in the tubular pivot 30. The openings 66 extend for substantially one-half of the circumference of the tubular pivot 30 so that there is no liability of the wires 63 being cut. The wires 63 and 64 are preferably coiled within the tubular pivot 30 and then extend into the longitudinal tubular pivot 28, as shown. Arranged upon the outer surface of the section or iron 21 is a mica plate 67, which is of the same shape and size as such outer face. Disposed upon the mica plate 67 are smaller mica plates 68, carrying the resistance element 69, wound thereon. Covering this resistance element is an outer mica plate 70, and a metallic plate 71 is arranged upon the outer mica plate and is attached to the wire 21 by screws 72 or the like. A covering 73 encloses the resistance element 69 and its edges engage the edges of the mica plate 67 and this cover is held in place by screws 74 or the like. One end of the resistance element 69 is connected with a wire 75, while its opposite end is connected with a wire 76, and these wires pass through an opening 77 of the shank 26 and enter the central portion of the longitudinal tubular coupling 28.

Figure 10:
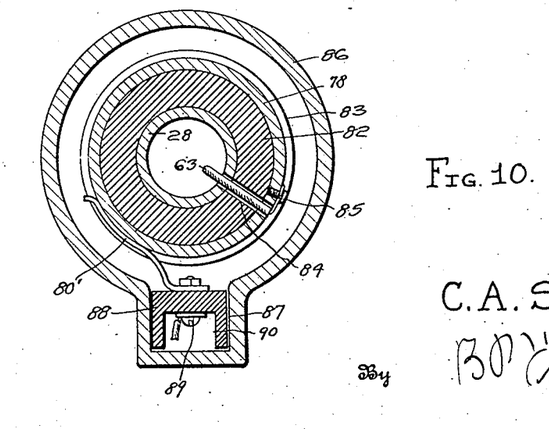
Figure 10 is a tranverse section taken on line 10—10 of Figure 4.

Arranged upon the longitudinal tubular coupling 28 and rigidly secured thereto and insulated therefrom are contact rings 78, 79, 80, and 81, secured to insulating rings 82, which may be provided with spacing flanges 83. The wire 63 is electrically connected with the contact ring 78, and this may be effected by passing the wire radially and outwardly through a hole 84, drilled through the elements as shown in Figure 10. The end of the wire may be electrically connected with the contact ring 78 by means of a binding screw 85 or the like. In a similar manner, the wire 64 may be electrically connected with the contact ring 79; the wire 75 with the contact ring 80; and the wire 76 with the contact ring 81. The contact rings and associated elements are preferably held within a housing 86, which is rigidly secured to the rear end of the casing by screws or the like. This housing is provided at its bottom with a pocket or trough 87, within which is held an insulating support or member 88. This insulating support or member has secured to its upper side contact springs 78', 79', 80' and 81', in permanent electrical contact with the contact rings 78, 79, 80 and 81, respectively.

Figure 4:
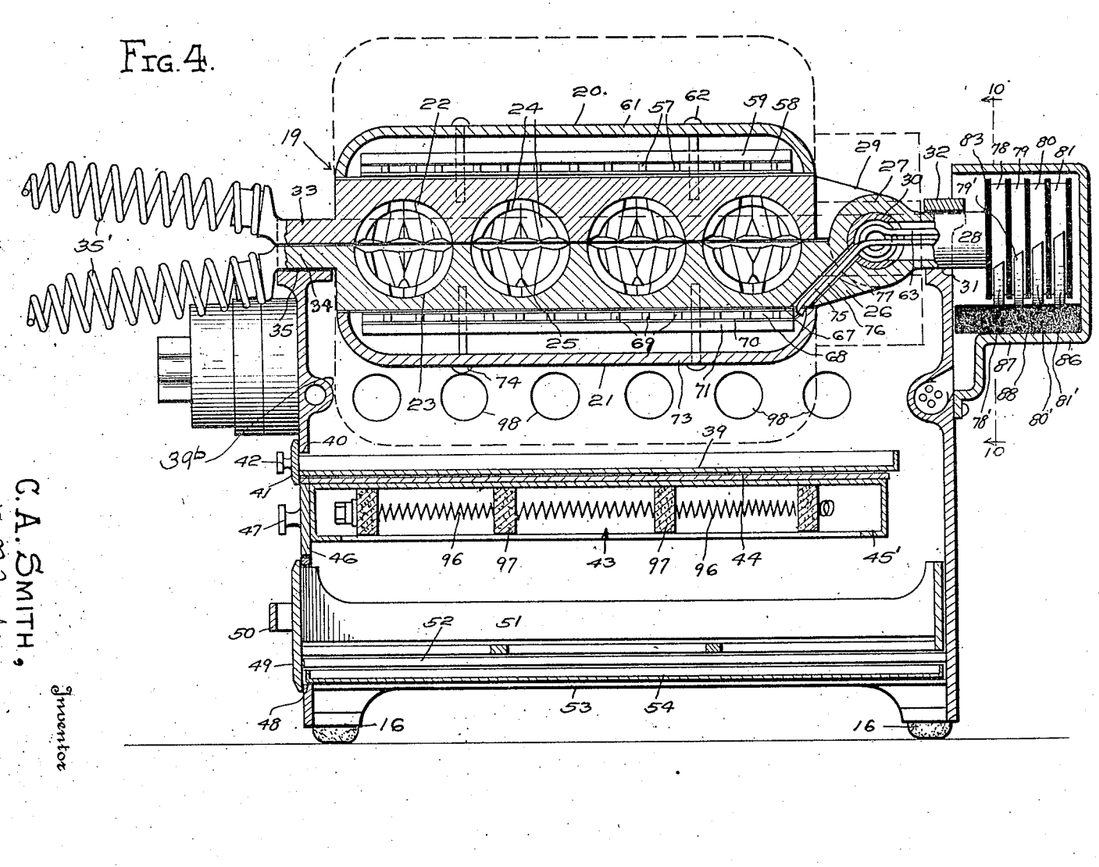
Figure 4 is a central vertical longitudinal section through the apparatus.
Figure 11:
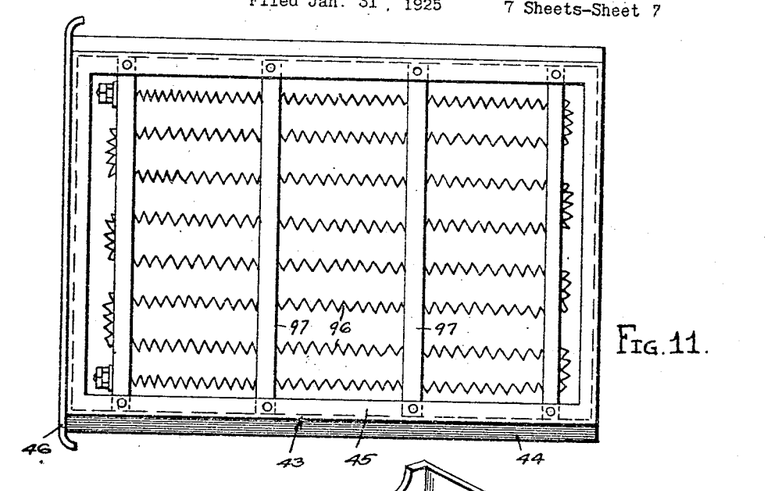
Figure 11 is a bottom plan view of the electrical heating element of the boiler or grill.
Figures 12, 13:
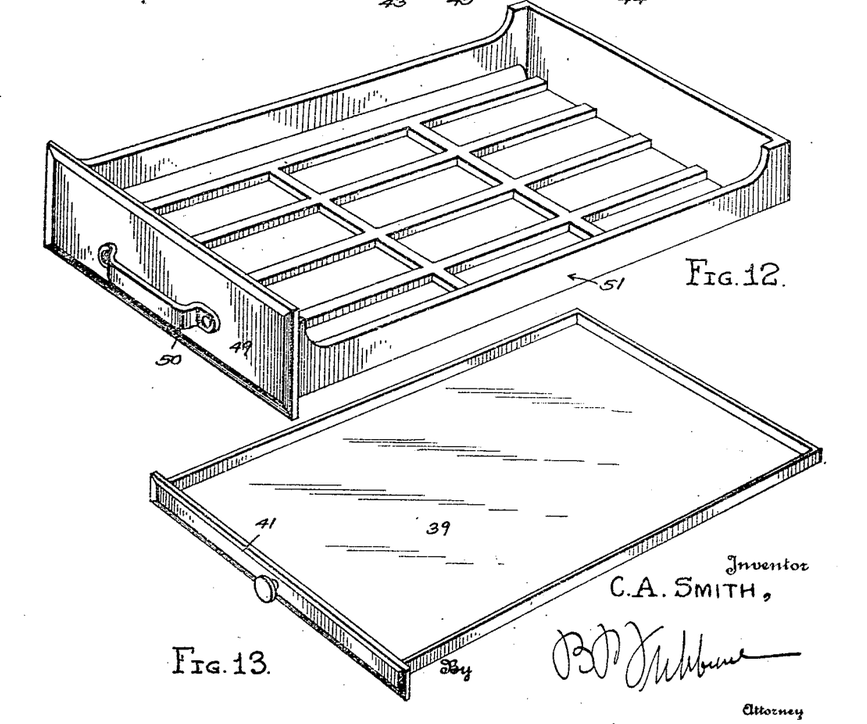
Figure 12 is a perspective view of a grill element.
Figure 13 is a perspective view of the fluid batter catch pan, and, Figure 14 is a diagrammatic view of the heating elements and circuits associated therewith.
Figure 14:
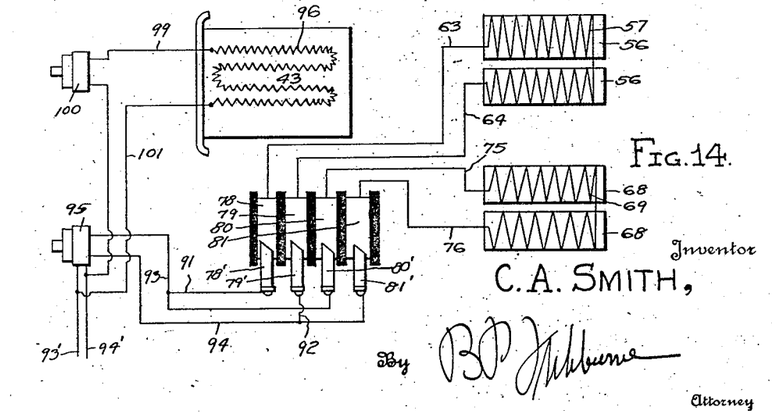

The spring contacts are held upon the insulating member by screws or binding posts 89, which extend into a longitudinal recess 90 in the bottom of the support 80. A wire 91 is electrically connected with the contact 78' and a wire 92 is electrically connected with the contact 79'. A wire 93 is electrically connected with the contact 80' and also with the wire 91. A wire 94 is electrically connected with the contact 81' and also with the wire 92. The numerals 93' and 94' designate lead wires which are connected with the wires 93 and 94 by means of a switch 95. This switch is located at the front end of the casing above and adjacent to the other devices of the unit. As clearly shown in Figures 4 and 11, an electrical heating element 96 is arranged within the supporting frame 45 and is carried by insulating bars 97. This heating element is arranged near and above the grill 51 and beneath the tray 39 and also beneath sets of longitudinal openings 98, preferably formed in the sides of the casing 15. One end of this electrical heating element 96 is connected with a wire 99, which is in electrical connection with the wire 94' and also has a switch 100 connected therewith, which switch is arranged at the front end of the casing, for the convenience of the operator. The other end of the heating element 96 is connected with a wire 101, electrically connected with the wire 93'. The lead wires 93' and 94' are connected with the wires 93 and 94, through the medium of the switch 95, as described, and the wires 93 and 94 pass through a conduit 93ª, extending from the front of the casing 15 along one side and then to the rear side of the casing and discharges into the trough 87. The wires 99 and 101 which are connected to the wires 93' and 94' pass through a transverse conduit 93ᵇ, formed upon the front of the casing, as shown.

In view of the foregoing description, it is thus seen that the switch 95 controls the current passing through heating elements 57 and 69, of the irons 20 and 21. This switch may be of such a construction that it will afford a plurality of temperatures, for the heating elements, or it may be a switch to simply cut the current off and on. The switch 100 controls the passage of the current to the heating element 96 and this switch may be of the same construction as the switch 95.

In the use of the apparatus, the electrical heating elements are set into action, so that the irons 20 and 21 are brought to a suitable temperature. It has been found that better results are obtainable if these irons are first gradually heated until the desired temperature for cooking is obtained. The frankfurter or other meat filler or any other edible filler to be heated or cooked, is now placed upon the grill 51, which may be accomplished by drawing the grill outwardly and the grill is then returned to the inner position. When the meat filler is suitably heated or cooked it is withdrawn from the grill and placed within the lower recess or pocket 23 and is supported therein by the lugs 25, spaced from the bottom of the recess. Where four recesses are provided in the iron, four frankfurters or the like are ordinarily inserted in the recesses. This being done, the batter, in a fluid condition, is poured into the recesses 23 and passes about and under the meat filler. The heat begins to cook the batter and the upper iron 20 should be brought down to the closed position quickly, and then both irons inverted. The expansion of the batter and the action upon the same of gravity, causes the batter to completely surround the then lower portions of the frankfurter. Before the cooked product can be removed from the mold, the irons must again be returned to the normal position with the lower iron 21 in the lower position, and this will permit of the upper iron 20 being moved to the upper position so that the cooked product may be removed. It will be found that the cooked product will not stick to the sections or irons 20 if they are formed of aluminum, and if they are formed of iron, it would be desirable that such irons be suitably greased prior to the introduction of the batter therein.

It is to be understood that the form of my invention herewith shown and described is to be taken as a preferred example of the same, and that various changes in the shape, size, and arrangement of parts may be resorted to without departing from the spirit of my invention or the scope of the subjoined claims.

Having thus described my invention, I claim:

1. In cooking apparatus, a support, normally upper and lower mold sections having co-acting recesses, the recesses in the lower mold section being deeper, means for pivotally connecting the mold sections with the support so that they may be inverted, said means permitting the upper mold section when in the upper position to be raised to the open position and preventing the lower mold section when in the upper position from being raised to the open position, and electrical heating elements for the mold sections.

2. In cooking apparatus, a support, a substantially horizontal member pivoted upon the support to turn upon its longitudinal axis, a mold section rigidly connected with the member, a co-acting mold section having pivotal connection with said member whereby it may be swung in a plane at substantially a right angle to the turning axis of said member, electrical heating elements arranged adjacent to the mold sections, and means to supply current to the electrical heating elements.

3. In cooking apparatus, a casing, a cooking mold mounted upon the upper portion of the casing, a removable grill mounted within the casing beneath the mold, an electrical heating element for the grill arranged within the casing above the grill, and a removable tray disposed within the casing between the electrical heating element and the mold for catching batter from the mold to prevent the same from passing to the electrical heating element, and electrical means to heat the mold.

4. In cooking apparatus, a casing, a cooking mold mounted upon the upper portion of the casing, electrical means to heat the cooking mold, a removable grill mounted within the casing beneath the mold, an electrical heating element for the grill arranged within the casing above the grill, a removable tray disposed within the casing between the electrical grill heating element and the mold to catch batter from the mold and pprevent the same from passing to such electrical grill heating element, and a removable drip pan within the casing beneath the grill.

5. In cooking apparatus, a support, a substantially horizontal member pivoted upon the support, to turn upon its longitudinal axis, a mold section connected with the member, a co-acting mold section having pivotal connection with said member whereby it may be swung in a plane at substantially a right angle to the turning axis of the member, electrical heating elements arranged adjacent to the mold sections, rings mounted upon the member and insulated therefrom, electrical connections between the rings and heating elements, and contacts engaging said rings.

6. In cooking apparatus, a support, a mold section, a tube connected with the mold section and pivotally mounted upon the support, a co-acting mold section pivotally connected with the tube, electrical heating elements for the mold sections, contact rings carried by the tube and insulated therefrom, wires connecting the contact rings and the heating elements and passing through the tube, contacts engaging the contact rings, and means for pivotally supporting the mold sections from said support.

7. In cooking apparatus, a support, a mold section, a tube connected with the rear end of the mold section and pivotally mounted upon the support, a co-acting mold section pivotally connected with the tube, electrical heating elements for the mold sections, contact rings carried by the tube and insulated therefrom, wires connecting the contact rings and the heating elements and passing through the tube, an insulated support disposed near the contact rings and carrying the contacts engaging said rings, a housing secured to the rear end of the support and enclosing the contact rings and contacts, a switch mounted upon the front end of the support and electrically connected with said contacts, and handles secured to the front end of the mold sections and serving to pivotally support said mold sections from said support.

8. In cooking apparatus, a support, a cooking mold pivotally mounted upon the support so that it may be inverted, a support disposed within the first named support for receiving an edible filler to be heated or cooked, the cooking mold and the second named support being disposed in spaced superposed relation, and electrical means to heat the mold and the second named support.

9. In cooking apparatus, a casing, a cooking mold pivotally mounted upon the casing so that it may be inverted with respect to the casing, said casing having outlet openings beneath the mold, a support within the casing beneath the openings for receiving an edible filler to be heated or cooked, electrical means within the mold to heat the mold, and separate electrical means to heat the material upon said support.

10. In cooking apparatus, a casing, mold sections pivotally rigidly connected with the rear of the casing, handles connected with the mold sections and serving to pivotally connect them with the front of the casing, said handles projecting beyond the front of the casing, a support within the casing for holding an edible filler to be heated or cooked, electrical means to heat the mold sections including a switch arranged at the front of the casing, and electrical means to heat the material upon said support including a switch arranged at the front of the casing.

In testimony whereof I affix my signature.

CLARENCE A. SMITH.